June 5, 1956  W. F. DUCKSTEIN  2,748,788
CENTRIFUGALLY OPERATED VALVE
Filed April 28, 1951
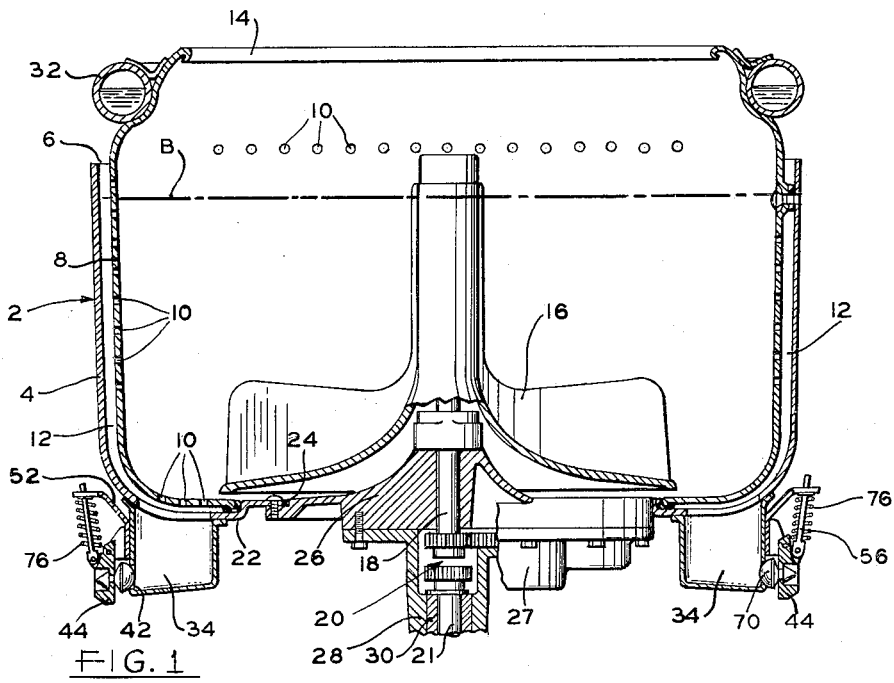
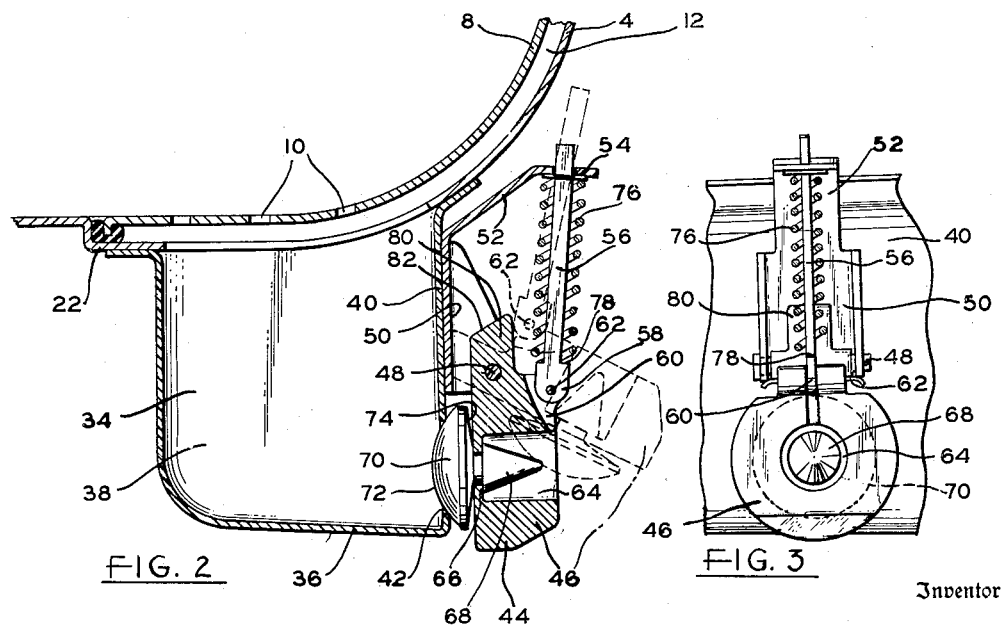
Inventor
William F. Duckstein
By Wilkinson, Huxley Byron & Hume
Attorney

United States Patent Office 2,748,788
Patented June 5, 1956

2,748,788

CENTRIFUGALLY OPERATED VALVE

William F. Duckstein, Newton, Iowa, assignor to The Maytag Company, Newton, Iowa, a corporation of Delaware Application April 28, 1951, Serial No. 223,598

5 Claims. (Cl. 137—53)

The invention relates to valves and more particularly to centrifugally operated valves adapted to be mounted on rotatable members or receptacles.

It is one of the objects of the invention to spring load a centrifugally operated valve body so that a substantialy constant closing force is applied to the valve regardless of whether the valve is in its closed or open position.

One of the characteristics of spring loaded centrifugally operated valves is that the spring loading increases as the valve moves in an opening direction against the spring and compresses the same. This increased loading may, in some instances, prevent full opening of the valve, or at least it tends to interfere with the normal desired valve operation. In a design of this type the valve body member requires additional weight to overcome the increased loading of the spring. Normally it is desirable to have a maximum closing force or pressure on the valve when it is in its seated position to guard against leakage and to remove or diminish this pressure when the centrifugal force reaches a predetermined value and the valve moves away from its seal, so that interference with proper valve operation is reduced to a minimum.

This is accomplished, in accordance with this invention, by mounting a compression type spring on a rotatable member so that it reacts on a pivotally mounted centrifugally operated valve through an effective torque arm to apply a maximum closing force to the valve when it is in its closed position and the member is not being rotated. As the valve moves to its open position, under the influence of centrifugal force, the normal closing force exerted by the spring is either maintained substantially constant or reduced, instead of increased, by decreasing the effective torque arm of the spring force with respect to the valve pivot.

It is therefore another object of the invention to provide a spring loading arrangement for a centrifugally operated valve construction which, while maintaining a maximum closing force when the valve is closed, provides a minimum amount of interference during the normal valve opening operation.

It is yet another object of the invention to mount a centrifugally operated valve to rotate about a pivot and to apply a spring loading to the valve which acts outwardly from the valve pivot to rotate the valve to its closed position and to act on the valve with a variable effective torque arm as the valve is moved to its open position.

It is still another object of the invention to provide a centrifugally operated valve operating mechanism which is relatively simple in construction and occupies a minimum amount of space.

Other objects, features, capabilities and advantages are comprehended by the invention, as will later appear and as are inherently possessed thereby.

Referring to the drawings:

Figure 1 is a partial vertical sectional view of a rotatable tub for a washing machine to which the improved centrifugally operated valve mechanism is applied;

Figure 2 is an enlarged vertical sectional view of the centrifugally operated valve and the valve operating mechanism as shown in Figure 1; and, Figure 3 is a side elevational view of the valve operating mechanism.

Referring now to the drawings for a tub construction having my improved centrifugally operated valve closing mechanism mounted thereon, there is shown a tub assembly 2 for a washing machine, which is adapted to be rotated about its vertical axis. This tub generally comprises an outer imperforate tub or receptable 4 having an upper open end 6 disposed above the normal liquid level B desired therein for the washing operation, and a spaced inner perforate tub or container 8, having perforations 10, secured therein in spaced relation to provide an annular liquid conducting space 12 therebetween. The upper end of the container 8 has an opening 14 therein through which the washing liquid and fabrics to be washed are inserted.

Washing means, such as, for example, a vertically mounted oscillatable agitator 16 is mounted within the confines of the container 8 to effect the proper washing action and this agitator may be oscillated by means of a shaft 18 whose lower end is connected to oscillating mechanism, generally referred to at 20, which in turn is driven by vertical shaft means 21 in any suitable manner by means of a drive motor (not shown). The imperforate receptacle 4 has a lower horizontal wall 22 whose inner end 24 overlaps and is secured to the outer peripheral portion of a central hub 26 which journals the oscillatable shaft 18 and houses a portion of the oscillating mechanism 20. The hub 26 in turn is bolted to a gear housing 27 having a lower central tubular portion 28 rigidly secured to an outer vertical tubular shaft 30 which supports and rotates the entire assembly. The shaft 21 for operating the oscillating mechanism 20 and the surrounding tubular shaft 30 extends downwardly and is supported by a combined radial and thrust bearing (not shown) and, when the tub is to be rotated during the liquid extracting operation the inner and outer shafts 21 and 30 are clutched together in any suitable manner to rotate in unison.

While the particular mounting for the rotatable tub construction is immaterial in this instance, the tub is mounted for lateral movement and a balancing ring 32 secured adjacent the open upper end 14 of the perforate container 8 is used to aid in balancing improperly distributed fabric loads during the extracting operation. Suitable additional mechanism may be provided to either hold the tub stationary and vertical during the washing operation or to aid in smoother operation when the tub is rotated during the extracting operation.

It has been found that during the washing operation sedimentary material removed from the fabrics passes through the openings 10 and has a tendency to collect in the annular space 12 between the perforated container 8 and the receptacle 4 and under certain conditions it is rather difficult to remove this material should it be given time to settle therein. Accordingly, there has been provided a pair of oppositely disposed sediment collecting chambers or recesses 34, each having a bottom wall 36, generally vertical side walls 38 and an outer wall 40, which are secured to the bottom wall 22 of the receptacle with their upper ends in direct communication with the lower portion of the annular space 12. Thus, during the washing operation, when the fabrics are being agitated, the sedimentary materials entering the space 12 through the openings 10 in the container tend to settle toward the bottom thereof and the movement of the washing liquid tends to circulate this material horizontaly. As the sedimentary material passes over the chambers 34 it settles therein and the danger of having it re-enter the container to soil the fabrics is substantially reduced.

Each chamber has an opening or passage 42 provided therein adjacent the lowermost portion of the outer wall 40 so that a portion of the liquid and the sedimentary material centrifugally collected in the chamber may be centrifugally discharged therethrough during the extracting operation. In order to prevent leakage of liquid through these openings during the washing operation or when the tub is stationary, a centrifugally operated valve 44 is provided which is adapted to move to its open position when the tub is rotated above a predetermined speed to permit washing liquid and the sedimentary material to escape through the openings and to close and seal the opening when the tub is rotated below a predetermined speed to prevent the flow of liquid therethrough.

Referring now more specifically to Figure 2, the valve 44 comprises a weighted movable body member 46 suspended on a stationary horizontal pivot pin or means 48 carried by a bracket 50 that is secured to the outer wall 40 of the sediment collecting chamber 34. This bracket 50 has an integral upwardly and outwardly directed arm 52 with an opening 54 therethrough adjacent its outermost end that is adapted to loosely receive and guide the upper end of a generally vertically disposed spring guide bar or rod 56. The lower end 58 of this bar fits relatively loosely within a slot 60 in the weighted body member 46 and it is pivotally secured thereto by means of a second horizontal pivot pin or means 62 which is mounted parallel to the stationary pin 48 but spaced outwardly therefrom to provide a crank or torque arm. The lower portion of the body member below the slot 60 is preferably provided with a recess 64 having a reduced neck portion 66 for receiving the shank or tab end 68 of a resilient poppet type valve 70. This valve may be provided with a substantially semi-spherical face 72 which is adapted to engage the outer periphery of the opening 42 to seal the same while the back portion 74 of the valve is relieved or frusto-conical in the direction of the weighted member 46, and it terminates at the shank portion 68 to permit a slight universal movement of the valve to thereby accommodate for slight misalignment and inaccuracies in the assembly.

A compression type spring 76 mounted about the bar 56 reacts between the arm 52 and a shoulder 78 on the lower end of the bar which in turn reacts on the bar pivot 62 mounted in the body member 46 to produce a clockwise turning movement or force about the horizontal pivot 48 to maintain the semi-spherical face 72 of the resilient poppet valve 70 against the opening 42 to seal the same against leakage during the washing operation.

With a construction of this kind it can be seen that when the valve member is in the closed position the pins 62 and 48 are generally in a horizontal plane and the bar 56 carrying the compression spring 76 acting on the pin 62 is in a generally vertical plane. Since the closing force of the spring 76 is substantially normal or at right angles to the horizontal position of the pivot pins, the effective torque arm is at a maximum; therefore, the spring 76 applies its maximum compressive or closing force to the valve body to hold the same in closed position. When the tub 2 is rotated above a predetermined speed, centrifugal force acting on the suspended weight portion of the valve member 44 moves the same outwardly (as shown in dot and dash lines in Figure 2). As the weight 44 pivoting about the pin 48 in a counter-clockwise direction moves the bar pivot pin 62 upwardly, increased loading or compression of the spring 76 will naturally take place, which in turn resists the opening movement of the valve by an amount equal to the increased spring loading; however, as the pivot pin 62 is moved upwardly to compress the spring, it also simultaneously moves through an arc inwardly with respect to the main pivot 48; therefore, the effective torque arm for closing the valve is decreased. In other words, since the opening 54 in the bracket arm 52 does not permit shifting of the upper portion of the bar 56 while the lower end moves inwardly with respect to the pivot 62, the angle of the application of the compressive force of the spring is shifted from a substantially vertical to an obtuse angle. The net result of this action or movement is to permit the valve 44 to move to its full open position, either under a relatively constant spring loading or with a slight decrease in loading.

Thus it can be seen the valve can remain in its open position with a minimum amount of interference from the spring 76 and that the valve body need not be provided with extra weight to compensate for the normal increase in spring compression which is inherent in the usual type of spring loaded centrifugally operated valves. Also, by providing a trigger or toggle action as shown, the spring and valve assembly may be designed to provide a compact arrangement that takes up very little space. This latter point is valuable in installations where the available space is limited.

In order to prevent the spring pivot 62 on the valve from moving past dead center with respect to the valve body pivot 48, as shown in Figure 2, the upper portion of the body member 44 is provided with an upwardly directed shoulder 80 having a chamfered surface or abutment 82 which is adapted to engage a portion of the bracket 50 to provide a positive stop for the valve when it is in its full open position. Thus, this abutment insures that the spring closing force acting through the pivot pin 62 will always be in such direction as to move the valve 44 to its closed position when the rotation of the tub 2 stops at the end of the extraction operation.

From the foregoing it can be seen that a spring loaded operating mechanism for a centrifugally operated valve has been provided which is relatively simple in construction, is compact and, while it maintains a maximum closing or sealing force on the valve during the washing operation, the spring loading tending to close the valve remains substantially constant as the valve moves to its open position.

While I have herein described and upon the drawing shown an illustrative embodiment of the invention, it is to be understood that the invention is not limited thereto, but may comprehend other constructions, arrangements of parts, details and features without departing from the spirit of the invention.

I claim:

1. A centrifugally operated valve for sealing an opening in a rotatable wall, comprising a stationary pivot pin secured to said wall adjacent said opening, a suspended weighted body member mounted on said pivot pin for arcuate movement toward and away from said opening, a sealing element carried on said body member for closing said opening, said body member and said sealing element having a combined mass center disposed adjacent said opening and responsive to centrifugal force to move said body member and said sealing element away from said wall to uncover said opening upon rotation of said wall about an axis substantially parallel to said wall, a second pivot pin carried by said body member laterally of said stationary pivot pin and movable thereabout from said lateral position when said opening is closed to a position above said stationary pivot when said opening is uncovered by said sealing element, and spring means disposed to apply a closing force to said body member transversely through said second pivot pin, said second pivot pin being movable in a direction to compress said spring means and to reduce the torque arm between said pivots to compensate for the increased spring compression as said centrifugally operated body member and said sealing element move away from said opening when said wall is rotated above a predetermined speed.

2. In a centrifugally operated valve for sealing an opening in a rotatable wall, the combination of a bracket secured to said wall adjacent said opening and having an outwardly extending arm, a stationary pivot pin secured to said bracket, a suspended body member mounted on said pin for arcuate movement toward and away from said opening, a sealing element carried by said body member and adapted to be moved into and out of sealing engagement with said opening, said body member and said sealing element having a combined mass center disposed below said pivot pin and responsive to centrifugal force to move said body member and said sealing element away from said wall and said opening upon rotation of said wall about an axis substantially parallel to said wall, a pivot pin carried by said body member laterally of said first mentioned pin to provide a torque arm and movable with said body member about said stationary pivot pin, a guide bar having one end secured to said last named pivot pin, and its other end loosely mounted in said outwardly extending arm on said bracket, a compression spring disposed about said guide bar between said arm and said last named pivot pin for applying an effective closing force to said body member which is at a maximum when the wall is stationary and said opening is closed by said sealing element, and stop means for limiting the opening movement of said body member when said wall is rotated above a predetermined speed.

3. A centrifugally operated valve for sealing a fluid conducting opening in a rotatable wall, comprising a stationary pivot mounted on said wall adjacent said opening, a weighted body member closing said opening and suspended from said stationary pivot for arcuate movement thereabout toward and away from said opening to control communication through said opening, said body member having a mass center disposed below said stationary pivot and responsive to centrifugal force to move said body member away from said wall to uncover said opening upon rotation of said wall about an axis substantially parallel to said wall, a second pivot carried by said body member laterally of said stationary pivot to provide a variable torque arm, and spring means for applying an effective closing force to said body member through said second pivot transversely to said stationary pivot, said spring means being compressed when said body member moves away from said opening while the effective torque arm between said pivots is reduced to thereby maintain a substantially constant closing force on said body member.

4. In a centrifugally operated valve for sealing an opening in a rotatable wall, the combination of a bracket secured to said wall adjacent said opening and having an outwardly extending arm, a stationary pivot secured to said bracket, a suspended body member mounted on said pivot for arcuate movement toward and away from said opening, a sealing element carried by said body member for closing said opening, said body member and sealing element having a mass center disposed below said stationary pivot and adjacent said opening and responsive to centrifugal force to move said body member and said sealing element away from said wall to uncover said opening upon rotation of said wall about an axis substantially parallel to said wall, a pivot pin carried by said body member laterally of said stationary pivot to provide a torque arm and movable with said body member about said stationary pivot, a guide bar having one end secured to said pivot pin and its other end loosely mounted in said outwardly extending arm on said bracket, a compression spring disposed about said guide bar between said arm and pivot pin for applying a closing force to said body member substantially normal to said torque arm when said wall is stationary and at an obtuse angle when said wall is rotated above a predetermined speed, and stop means carried by said body member for limiting the opening movement of said body member when said wall is rotated above said predetermined speed.

5. Centrifugal valve construction comprising a valve port; a pivot bearing arranged to one side of said valve port; a weighted valve carrying member pivoted in said pivot bearing in closing relation to said port; a second bearing carried by said member in offset relation to said pivot bearing; a third bearing stationarily mounted upon structure contiguous to said port in spaced relation to said member and in alignment with said second bearing thereof, said member having its mass center disposed adjacent said valve port and in an opposite direction from said third bearing with reference to said second bearing; a guide bar extending through said third bearing in sliding relation therewith, said bar extending to and being journaled in said second bearing; an expansion spring surrounding said bar and terminating adjacent said second bearing at one end, and against said third bearing at its other end, said spring urging said member into port closing position; said bearings in valve closing position being disposed so that a line connecting said pivot bearing and said second bearing and said second and third bearings will describe an angle of approximately 90 degrees, which angle increases and approaches a straight line relationship as said valve progressively opens.

References Cited in the file of this patent

UNITED STATES PATENTS

| | | |
|---|---|---|
| 627,390 | Cash | June 20, 1899 |
| 1,419,988 | Rohrer | June 20, 1922 |
| 1,473,823 | Lewis | Nov. 13, 1923 |
| 1,483,484 | Rubert | Feb. 12, 1924 |
| 1,526,406 | Wisherd | Feb. 17, 1925 |
| 1,751,982 | Dunham | Mar. 25, 1930 |
| 2,110,920 | Schnitzler | Mar. 15, 1938 |
| 2,287,036 | Hufford | June 23, 1942 |
| 2,556,277 | Hill et al. | June 12, 1951 |